(12) United States Patent
Haruyama (10) Patent No.: US 10,527,889 B2
(45) Date of Patent: Jan. 7, 2020

(54) LIQUID-CRYSTAL DISPLAY DEVICE AND ELECTRONIC APPARATUS

(71) Applicant: SEIKO EPSON CORPORATION, Tokyo (JP)

(72) Inventor: Akihide Haruyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/012,271

(22) Filed: Jun. 19, 2018

(65) Prior Publication Data
US 2019/0004344 A1    Jan. 3, 2019

(30) Foreign Application Priority Data
Jun. 29, 2017    (JP) .................................. 2017-128124

(51) Int. Cl.
*G02F 1/13363*    (2006.01)
*G02F 1/137*    (2006.01)
*G02F 1/1337*    (2006.01)

(52) U.S. Cl.
CPC .... *G02F 1/13363* (2013.01); *G02F 1/133632* (2013.01); *G02F 1/133634* (2013.01); *G02F 2001/13712* (2013.01); *G02F 2001/133631* (2013.01); *G02F 2001/133635* (2013.01); *G02F 2001/133746* (2013.01)

(58) Field of Classification Search
None
See application file for complete search history.

(56) References Cited

U.S. PATENT DOCUMENTS

| | | |
|---|---|---|
| 2004/0156001 A1 | 8/2004 | Moriya |
| 2006/0203160 A1 | 9/2006 | Moriya |
| 2006/0268207 A1 | 11/2006 | Tan et al. |
| 2007/0064163 A1 | 3/2007 | Tan et al. |
| 2009/0115941 A1* | 5/2009 | Nakagawa ........ G02F 1/133634 349/96 |
| 2009/0128719 A1 | 5/2009 | Tateno |
| 2010/0026918 A1* | 2/2010 | Nakagawa ........... G02B 5/3083 349/5 |
| 2012/0188497 A1* | 7/2012 | Hirota .................. G02F 1/1337 349/123 |
| 2014/0063418 A1 | 3/2014 | Zhao |
| 2019/0155082 A1* | 5/2019 | Sakai ................ G02F 1/133528 |

FOREIGN PATENT DOCUMENTS

| | | |
|---|---|---|
| JP | 2004-240102 A | 8/2004 |
| JP | 4608459 B2 | 1/2011 |
| JP | 5262388 B2 | 8/2013 |
| JP | 2013-178556 A | 9/2013 |

* cited by examiner

*Primary Examiner* — Phu Vu
(74) *Attorney, Agent, or Firm* — Oliff PLC (57) ABSTRACT

The invention provides a new technique for improving the contrast in a liquid-crystal display device having a liquid crystal layer that is formed of pretilted liquid crystal molecules having a negative dielectric constant anisotropy. A liquid-crystal display device according to an aspect of the invention includes a liquid crystal panel in which a phase-difference compensation layer including a C plate is formed, and a phase-difference compensation member disposed on the outside of the liquid crystal panel and including an O plate or an A plate. The liquid crystal panel includes an opposing substrate, a liquid crystal layer formed of pretilted liquid crystal molecules having a negative dielectric constant anisotropy, and an element substrate.

11 Claims, 6 Drawing Sheets

LIQUID-CRYSTAL DISPLAY DEVICE AND ELECTRONIC APPARATUS

BACKGROUND

1. Technical Field

The present invention relates to a liquid-crystal display device and an electronic apparatus.

2. Related Art

Liquid-crystal display devices operating in a vertically aligned (VA) mode are used as light bulbs for projectors, etc. In a liquid crystal layer of a VA-mode liquid-crystal display device, liquid crystal molecules having a negative dielectric constant anisotropy are aligned substantially vertically to a substrate plane. To control the direction in which the liquid crystal molecules are tilted when a voltage is applied, the liquid crystal molecules are pretilted by, for example, a few degrees from the direction normal to the substrate plane.

The optical anisotropy of the liquid crystal layer causes a phase difference in the light passing through the liquid crystal layer. For example, as described in Japanese Patent No. 5262388, a VA-mode liquid-crystal display device uses a phase-difference compensation part, in which a C plate and two O plates are combined, to compensate for the phase difference to improve the contrast. This phase-difference compensation part, in which the C plate and the two O plates are integrated as a single component, is disposed on the outside of the liquid crystal panel.

A further improvement in the contrast in VA-mode liquid-crystal display devices is required.

SUMMARY

An advantage of some aspects of the invention is that it provides a new technique for improving the contrast in a liquid-crystal display device having a liquid crystal layer that is formed of pretilted liquid crystal molecules having a negative dielectric constant anisotropy.

A liquid-crystal display device according to a first aspect of the invention includes a liquid crystal panel in which a phase-difference compensation layer including a C plate is formed, and a phase-difference compensation member disposed on the outside of the liquid crystal panel and including an O plate or an A plate. The liquid crystal panel includes an opposing substrate, a liquid crystal layer formed of pretilted liquid crystal molecules having a negative dielectric constant anisotropy, and an element substrate.

According to this aspect, it is possible to compensate for, with a phase-difference compensation part in which the C plate and the O plate of the A plate are combined, a phase difference of light caused by the liquid crystal layer formed of pretilted liquid crystal molecules having a negative dielectric constant anisotropy. This phase-difference compensation part, in which the C plate is provided in the phase-difference compensation layer in the liquid crystal panel, improves the contrast, compared with a case where all the components of the phase-difference compensation part are disposed on the outside of the liquid crystal panel.

It is preferable that the phase-difference compensation member include two O plates. This configuration makes it easy to adjust the positions of the two O plates.

It is preferable that the phase-difference compensation layer include the C plate and an O plate. This configuration makes it possible to compensate for a front-direction phase difference with the phase-difference compensation layer.

It is preferable that the phase-difference compensation layer be formed in the opposing substrate. This configuration makes it easy to form the phase-difference compensation layer in the liquid crystal panel, compared with a case where the phase-difference compensation layer is formed in the element substrate.

An electronic apparatus according to a second aspect of the invention includes the above-described liquid-crystal display device.

Because the electronic apparatus has the above-described liquid-crystal display device, it is possible to improve the contrast.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described in detail below with reference to the attached drawings. In the drawings, the dimensions and scales of components are differentiated, as appropriate, from those in actuality. Although the embodiments described below, which are preferred examples of the invention, involve various technically preferred limitations, the scope of the invention is not limited to such embodiments, unless otherwise specifically stated so in the description below.

First Embodiment

Figure 1:
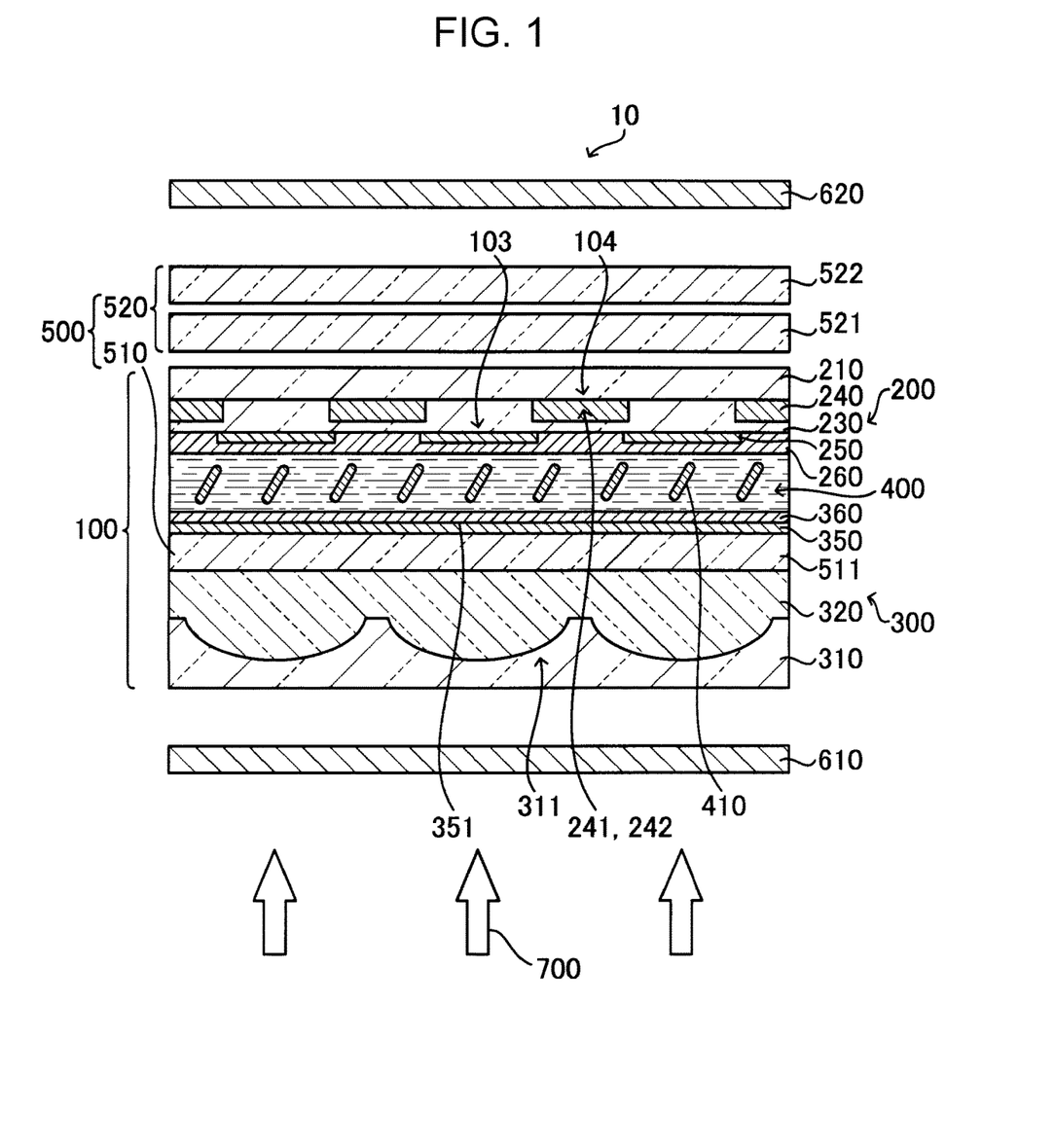
FIG. 1 is a schematic sectional view showing the configuration of a liquid-crystal display device according to a first embodiment.

A liquid-crystal display device 10 according to a first embodiment of the invention will be described. FIG. 1 is a schematic sectional view showing an example configuration of the liquid-crystal display device 10 according to the first embodiment. The liquid-crystal display device 10 includes a polarizing plate 610, a polarizing plate 620, a liquid crystal panel 100, and a phase-difference compensation member 520.

As will be described below, a C plate, an O plate, or an A plate is used as an element for compensating for a phase difference in the liquid-crystal display device 10. The index ellipsoid (the three-dimensional distribution of the refractive index) of each plate is defined as below. It is assumed that: the coordinate axis in the substrate plane is an XY-axis; the substrate normal is a Z-axis; the principal refractive index in the X-axis direction is Nx, the principal refractive index in the Y-axis direction is Ny, and the principal refractive index in the Z-axis direction is Nz. The index ellipsoid of the A plate (positive A plate) satisfies Nx>Ny=Nz. The index ellipsoid of the C plate (negative C plate) satisfies Nx=Ny>Nz. The index ellipsoid of the O plate is inclined with respect to the substrate. For example, the index ellipsoid of the O plate is inclined with respect to Nx>Ny>Nz about the Y-axis, serving as the rotation axis, at an angle from the substrate normal, and, when viewed from the substrate normal, the slow axis in the cross section of the ellipsoid taken along the XY plane matches the Y-axis direction. However, it not limited to the above-described conditions, and the Y-axis direction may match the fast axis, depending on the shape and inclination of the ellipsoid.

First, the liquid crystal panel 100 will be described. The liquid crystal panel 100 includes an element substrate 200, an opposing substrate 300 that is disposed so as to oppose the element substrate 200, and a liquid crystal layer 400 interposed between the element substrate 200 and the opposing substrate 300.

Figure 2:
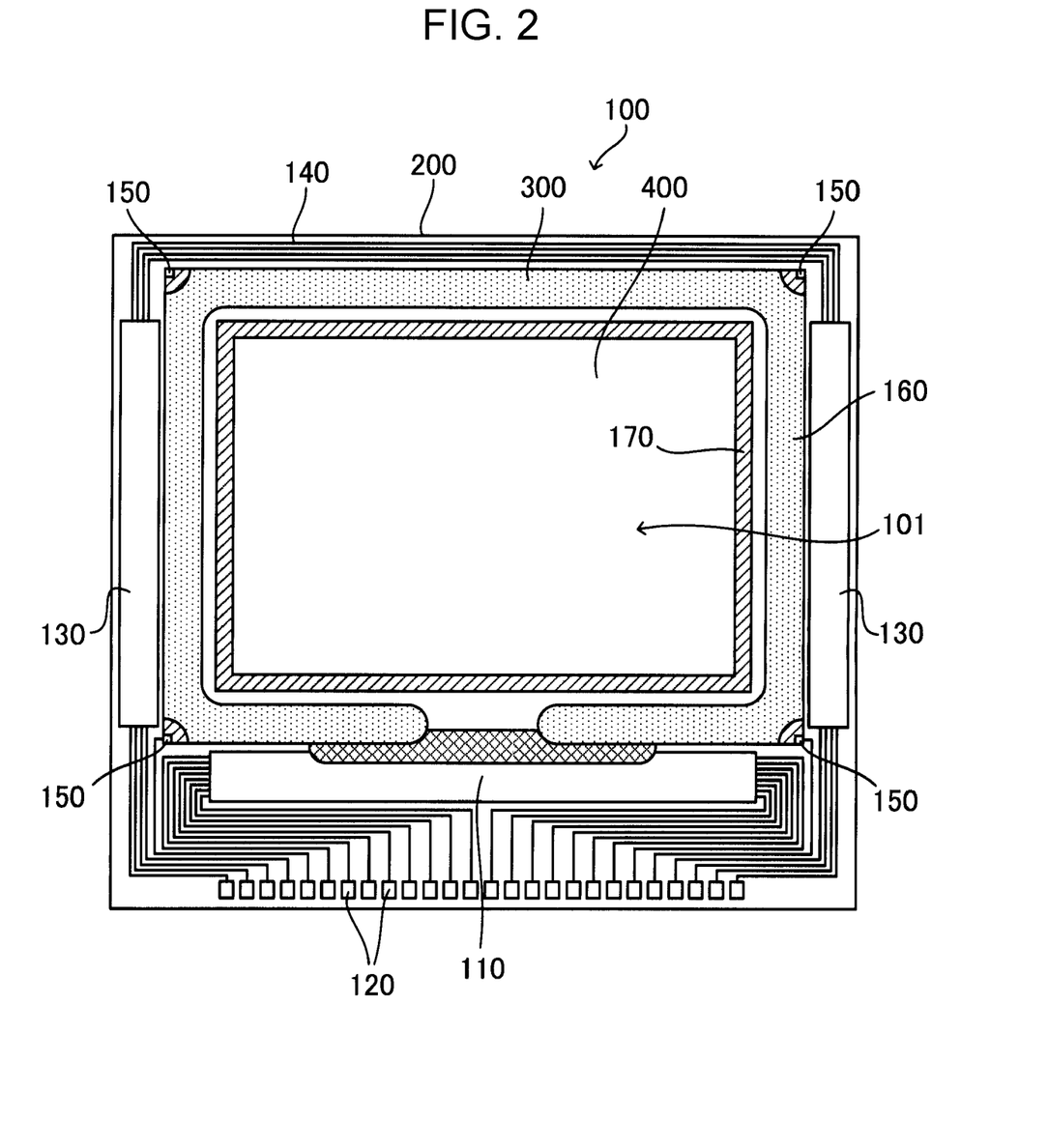
FIG. 2 is a schematic plan view showing the configuration of a liquid crystal panel.
Figure 3:
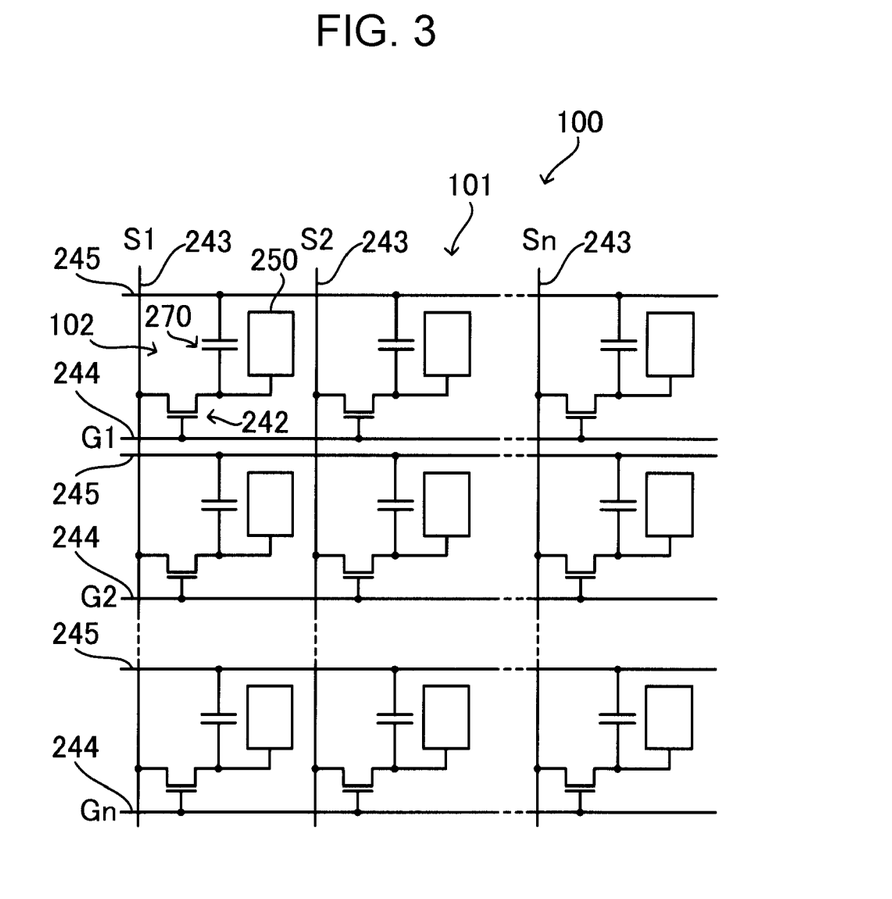
FIG. 3 is an equivalent circuit diagram showing the electrical configuration of the liquid crystal panel.

Referring to FIGS. 2 and 3, the schematic configuration in plan view and electrical configuration of the liquid crystal panel 100 will be described, before the configuration of the liquid crystal panel 100 in sectional view will be described. FIG. 2 is a schematic plan view showing an example configuration of the liquid crystal panel 100.

The element substrate 200 and the opposing substrate 300 are joined together by a frame-shaped sealing member 160. The liquid crystal layer 400 is formed of a liquid crystal that fills a space enclosed by the element substrate 200, the opposing substrate 300, and the sealing member 160.

The sealing member 160 is formed of, for example, an adhesive, such as a thermosetting or ultraviolet setting epoxy resin. The sealing member 160 contains spacers for maintaining a constant distance between the element substrate 200 and the opposing substrate 300. A peripheral member 170, which is formed of a light-shielding material, is formed on the inner side of the sealing member 160. The inner side of the peripheral member 170 serves as a display region 101, in which a plurality of pixels are arranged. FIG. 1 shows a sectional view of the display region 101.

A data-line driving circuit 110 and external-circuit mounting terminals 120 are provided along one side of the element substrate 200, on the outer side of the sealing member 160, and scanning-line driving circuits 130 are provided along the two sides adjacent to this one side. Wiring lines 140 connecting the scanning-line driving circuits 130 are provided on the remaining side of the element substrate 200. Inter-substrate conducting members 150 for electrically connecting the element substrate 200 and the opposing substrate 300 are provided at the corners of the opposing substrate 300.

FIG. 3 is an equivalent circuit diagram showing an example electrical configuration of the liquid crystal panel 100. A plurality of pixels 102 are arranged in columns and rows in the display region 101. Each pixel 102 has a pixel electrode 250 and a thin film transistor (TFT) 242, serving as a switching element. The source electrodes of the TFTs 242 are electrically connected to data lines 243 extending from the data-line driving circuit 110. The data-line driving circuit 110 supplies image signals (data signals) S1, S2, . . . , Sn to the data lines 243 in line-sequence. The gate electrodes of the TFTs 242 are electrically connected to scanning lines 244 extending from the scanning-line driving circuits 130. The scanning-line driving circuits 130 supply scanning signals G1, G2, . . . , Gn to the scanning lines 244 in line-sequence. The drain electrodes of the TFTs 242 are electrically connected to the pixel electrodes 250.

By turning on the TFTs 242 for a certain period of time, the image signals S1, S2, . . . , Sn are written in the pixel electrodes 250, via the data lines 243, at predetermined timing. The image signals at predetermined levels written in the liquid crystal layer 400 via the pixel electrodes 250 are retained for a certain period of time in liquid crystal capacitors formed between the liquid crystal layer 400 and a common electrode 350 (see FIG. 1) provided in the opposing substrate 300.

To prevent leakage of the retained image signals S1, S2, . . . , Sn, storage capacitors 270 are formed between the pixel electrodes 250 and capacitor lines 245 and are arranged parallel to the liquid crystal capacitors. When voltage signals are applied to the liquid crystal of the pixels 102, changing the alignment state of the liquid crystal molecules according to the level of the voltages applied, the light incident on the liquid crystal layer 400 is modulated, enabling gradation display.

Referring back to FIG. 1, the configuration of the liquid crystal panel 100 in sectional view will be described. The direction perpendicular to the common electrode 350 provided in the opposing substrate 300 (more specifically, the direction perpendicular to a surface 351 of the common electrode 350 facing the liquid crystal layer 400) is referred to as the thickness direction. A plan view is a view of the liquid crystal panel 100 in the thickness direction. A plane perpendicular to the thickness direction, that is, a plane parallel to the surface 351 of the common electrode 350 is referred to as the substrate plane, and the normal to the substrate plane is referred to as the substrate normal. The direction perpendicular to the surface of a base member 310 of the opposing substrate 300, or the direction perpendicular to the surface of a base member 210 of the element substrate 200 may also be referred to as the thickness direction. For the ease of description of the thickness direction of the liquid crystal panel 100, the sides of the opposing substrate 300 and element substrate 200 adjacent to the liquid crystal layer 400 will be referred to as the upper sides.

The opposing substrate 300 includes the base member 310, a lens layer (micro lens) 320, a phase-difference compensation layer 510, the common electrode 350, and an alignment film 360. The base member 310 is formed of a light-transmissive material, such as glass or quartz. The upper surface of the base member 310 has curved recesses 311, which are provided corresponding to the respective pixel electrodes 250, and thus, the respective pixels 102. The lens layer 320 is formed on the base member 310 so as to cover the recesses 311. The lens layer 320 is formed of a light-transmissive material, such as silicon oxynitride, that has a higher visible-light refractive index than the material of the base member 310.

The phase-difference compensation layer 510 is formed on the lens layer 320. In this embodiment, the phase-difference compensation layer 510 is a single C plate 511. The C plate 511 is formed by, for example, alternately stacking high-refractive-index layers and low-refractive-index layers. The high-refractive-index layers are formed of, for example, niobium oxide having a refractive index of 2.3, the thickness of each layer being 20 nm. The low-refractive-index layers are formed of, for example, silicon oxide having a refractive index of 1.5, the thickness of each layer being 20 nm. The C plate 511 is formed by alternately stacking about 20 high-refractive-index layers and about 20 low-refractive-index layers by, for example, sputtering.

The common electrode 350 is formed on the phase-difference compensation layer 510. The common electrode 350 is formed of a conducting, light-transmissive material, such as indium tin oxide (ITO) or indium zinc oxide (IZO). The alignment film 360 is formed on the common electrode 350. The alignment film 360 is formed by, for example, obliquely depositing silicon oxide or the like.

The element substrate 200 includes the base member 210, the insulating layer 230, non-opening-region structures 240, the pixel electrodes 250, and the alignment film 260. The base member 210 is formed of a visible-light-transmissive material, such as glass or quartz. The insulating layer 230 is formed on the base member 210. The insulating layer 230 is formed of an insulating, light-transmissive material, such as silicon oxide.

The non-opening-region structures 240 are provided in the insulating layer 230. Light-shielding members 241 and the TFTs 242 formed in the insulating layer 230 are collectively referred to as the non-opening-region structures 240. The non-opening-region structures 240 are schematically and symbolically illustrated in a rectangular shape.

The light-shielding members 241 are formed so as to include a plurality of light-shielding layers, which are formed of a visible-light-shielding material, such as polysilicon, metal, metal silicide, metallic compound. The TFTs 242 each include a semiconductor layer, which has a source region, a channel region, and a drain region of the transistor.

The light-shielding members 241 are provided along the peripheries of the pixel electrodes 250 so as to surround the pixel electrodes 250 in plan view. The regions surrounded by the light-shielding members 241 serve as opening regions (light-transmitting regions) 103 of the pixels 102 through which the light passes. By collecting light with the lens layer 320 formed in the opposing substrate 300, it is possible to allow the light to be efficiently incident on the opening regions 103 of the pixels 102.

In plan view, the regions where the light-shielding members 241 are provided serve as non-opening regions (light-shielding regions) 104 through which the light does not pass. Examples of the light-shielding layers in the light-shielding members 241 include the data lines 243 and the scanning lines 244. The light-shielding layers in the light-shielding members 241 overlap one another in plan view. The TFTs 242 are provided in the non-opening regions 104 so as to be located between the light-shielding layers in the thickness direction.

The pixel electrodes 250 are provided on the insulating layer 230. The pixel electrodes 250 are formed of a conducting, light-transmissive material, such as ITO or IZO. The alignment film 260 is provided on the insulating layer 230 so as to cover the pixel electrodes 250. The alignment film 260 is formed by, for example, obliquely depositing silicon oxide or the like.

The liquid crystal layer 400 is formed of liquid crystal molecules 410 having a negative dielectric constant anisotropy. The liquid crystal molecules 410 are pretilted by the alignment film 260 and the alignment film 360. The pretilt angle is, for example, 87° from the substrate plane (the surface 351 of the common electrode 350). The liquid crystal panel 100 has this liquid crystal layer 400 and operates in a vertical alignment (VA) mode.

Next, the overall configuration of the liquid-crystal display device 10 will be described. The polarizing plate 610 and the polarizing plate 620 are arranged so as to have the liquid crystal panel 100 therebetween. The polarizing plate 610 is disposed on the opposite side of the opposing substrate 300 from the liquid crystal layer 400, and the polarizing plate 620 is disposed on the opposite side of the element substrate 200 from the liquid crystal layer 400.

The liquid-crystal display device 10 is a transmissive display device in which incident light 700 enters from the polarizing plate 610 side and exits from the polarizing plate 620 side. Hence, in the liquid crystal panel 100, the incident light 700 entering from the opposing substrate 300 side is modulated by the liquid crystal layer 400 and exits from the element substrate 200 side.

The polarizing plate 610 and the polarizing plate 620 are arranged in a cross-Nicol manner, in which the transmission axis of the polarizing plate 610 and the transmission axis of the polarizing plate 620 are perpendicular (90° to each other plan view. However, taking manufacturing tolerance or the like into consideration, the angle formed between the transmission axis of the polarizing plate 610 and the transmission axis of the polarizing plate 620 does not need to be exactly 90°, and the angle may be in the range of, for example, 90°±5°.

To increase the transmissivity when the voltage is applied, the azimuth of the pretilt, in other words, the direction of the angle of the liquid crystal molecules 410 in plan view is set to 45° with respect to the transmission axis of the polarizing plate 610 or the transmission axis of the polarizing plate 620. However, taking manufacturing tolerance or the like into consideration, the angle formed between the azimuth of the pretilt and the transmission axis of the polarizing plate 610 or the transmission axis of the polarizing plate 620 does not need to be exactly 45°, and the angle may be in the range of, for example, 45°±5°.

The phase-difference compensation member 520 is disposed on the outside of the liquid crystal panel 100. More specifically, the phase-difference compensation member 520 is disposed on the opposite side of the element substrate 200 from the liquid crystal layer 400 and is disposed between the liquid crystal panel 100 and the polarizing plate 620. The phase-difference compensation member 520 may be bonded to the base member 210 of the element substrate 200.

In this embodiment, a member in which two O plates 521 and 522 are stacked on one another serves as the phase-difference compensation member 520. The O plate 521 is formed by, for example, obliquely depositing tantalum oxide or the like on a light-transmissive base member, such as a glass plate or the like. The O plate 522 is formed in the same way as the O plate 521. The two O plates 521 and 522 may be formed either integrally on the same light-transmissive base member or independently on different light-transmissive base members.

The phase-difference compensation part 500 is formed by combining the phase-difference compensation layer 510, which is formed on the liquid crystal panel 100, and the phase-difference compensation member 520, which is disposed on the outside of the liquid crystal panel 100.

When no voltage is applied, the liquid crystal molecules 410 in the liquid crystal layer 400 are aligned substantially in the substrate normal direction (thickness direction). Thus, the liquid crystal layer 400 has optical anisotropy in a plane perpendicular to the substrate plane (in a plane parallel to the thickness direction) and thus causes a phase difference in the light obliquely incident on the liquid crystal layer 400 from a direction shifted from the substrate normal direction as the light passes through the liquid crystal layer 400. The lens layer 320 is disposed at a position closer to the side from which the light is incident than the liquid crystal layer 400 is, and, as a result of refraction occurring in the lens layer 320, more light is obliquely incident on the liquid crystal layer 400.

When no voltage is applied, the liquid crystal layer 400 also has an optical anisotropy in the substrate plane (in a plane perpendicular to the thickness direction) due to the pretilt. Thus, the liquid crystal layer 400 also causes a phase difference in the light incident on the liquid crystal layer 400 in the substrate normal direction (from the front) as the light passes through the liquid crystal layer 400.

The C plate 511 has a light axis extending in the substrate normal direction and is optically isotropic in the substrate plane but is optically anisotropic in a plane perpendicular to the substrate plane. Accordingly, it is possible to compensate for the phase difference of the light obliquely incident on the liquid crystal layer 400 with the phase-difference compensation layer 510.

The O plate 521 has a light axis extending in an oblique direction shifted from the substrate normal and is optically anisotropic in the substrate plane and a plane perpendicular to the substrate plane. The O plate 522 also has the same properties as the O plate 521. Accordingly, it is possible to compensate for the phase difference of the light incident on the liquid crystal layer 400 from the front with the phase-difference compensation member 520. It is also possible to compensate for the phase difference of the light incident on the liquid crystal layer 400 in the oblique direction with the phase-difference compensation member 520.

This way, it is possible to compensate for, at least, the phase difference due to the liquid crystal layer 400 with the phase-difference compensation part 500. Besides the phase difference caused by the liquid crystal layer 400, there are various other phase differences in the liquid-crystal display device 10, such as the phase difference caused by components of the polarizing plates 610 and 620, and the phase difference caused by diffraction occurring at fine opening regions 103. The phase-difference compensation part 500 can compensate for all the phase differences, including the phase difference caused by the liquid crystal layer 400 and the phase differences caused by various other factors. By compensating for the phase differences, the contrast of the liquid-crystal display device 10 is improved.

The refractive index, the thickness, and other properties of the C plate 511, the O plate 521, and the O plate 522 can be appropriately selected so that all the phase differences are appropriately compensated for. The positional relationship between the O plate 521 and the O plate 522 can be appropriately adjusted so that all the phase differences are appropriately compensated for.

It is desirable that at least one of the O plate 521 and the O plate 522 be rotated about the substrate normal to be appropriately positioned so that the black level observed when no voltage is applied is minimum, that is, so that the highest contrast is achieved.

The two O plates 521 and 522 are provided in the phase-difference compensation member 520 and are disposed on the outside of the liquid crystal panel 100. Thus, it is easy to adjust the positions of the two O plates 521 and 522. To make the adjustment easy, it is desirable that the O plate 521 and the O plate 522 be formed as independent plates.

Figure 6:
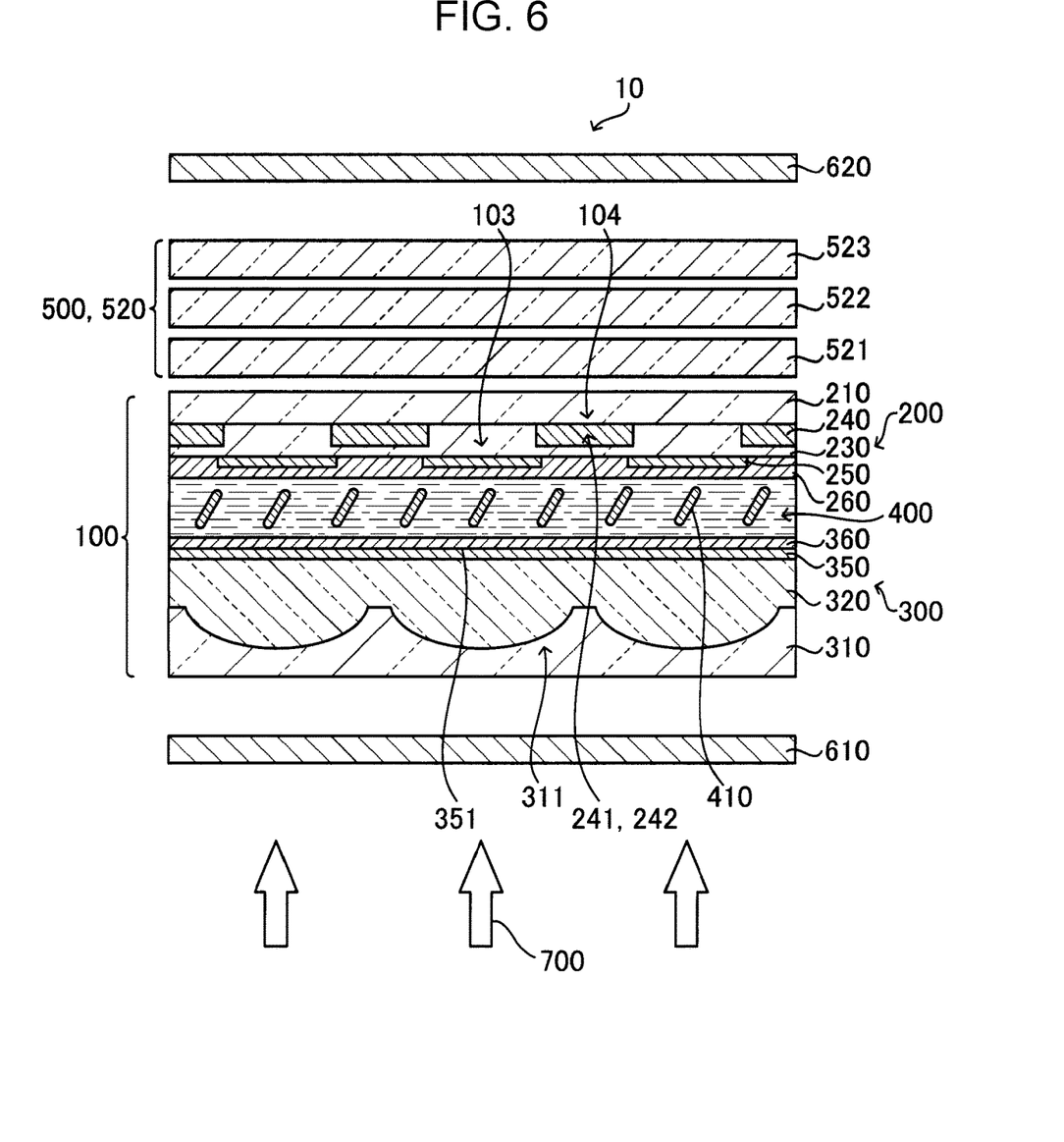
FIG. 6 is a schematic sectional view showing the configuration of a liquid-crystal display device according to a comparison example.

The liquid-crystal display device 10 according to a comparison example will be described. FIG. 6 is a schematic sectional view showing an example configuration of the liquid-crystal display device 10 according to the comparison example. The liquid-crystal display device 10 according to the comparison example differs from that according to the first embodiment in that the liquid crystal panel 100 does not have the phase-difference compensation layer 510, in that the phase-difference compensation part 500 is formed only of the phase-difference compensation member 520 disposed on the outside of the liquid crystal panel 100, and in that the phase-difference compensation member 520 has a C plate 523 in addition to the two O plates 521 and 522.

The inventor compared the contrast achieved with a sample having a first-embodiment configuration and the contrast achieved with a sample having a comparison-example configuration. The result showed that the first-embodiment configuration provides 1.3 times higher contrast than the comparison-example configuration.

As described in Japanese Patent No. 5262388, typically, a phase-difference compensation part in which a C plate and two O plates are combined is disposed such that all the components of the phase-difference compensation part are disposed on the outside of the liquid crystal panel with the C plate and the O plates being stacked on one another, as in the configuration of the comparison example. In the first embodiment, the C plate of the phase-difference compensation part is disposed inside the liquid crystal panel to improve the contrast.

The invention is not limited to the above-described embodiment, and application to other embodiments described below and various changes and modifications are possible. One or more of the other embodiments described below and the modifications may be combined as appropriate.

Second Embodiment

Figure 4:
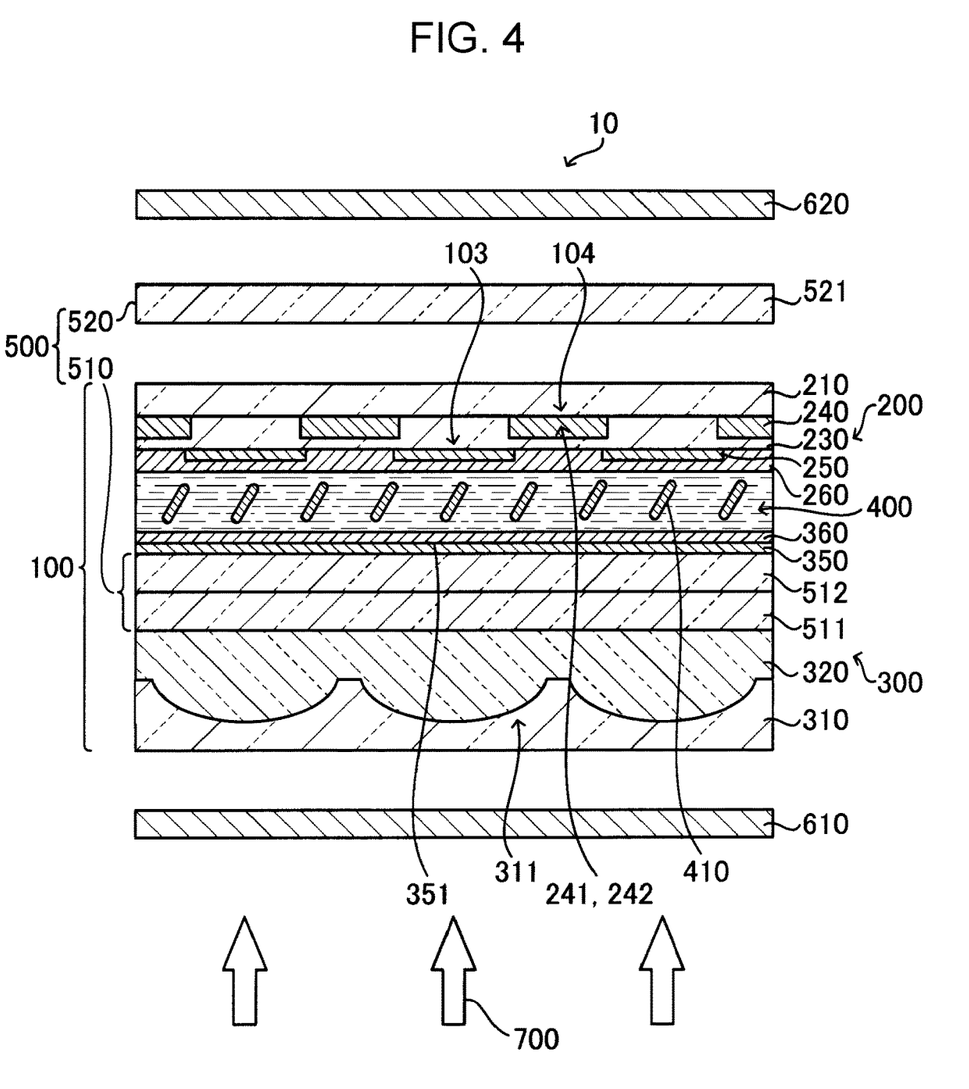
FIG. 4 is a schematic sectional view showing the configuration of a liquid-crystal display device according to a second embodiment.

The liquid-crystal display device 10 according to a second embodiment will be described. FIG. 4 is a schematic sectional view showing an example configuration of the liquid-crystal display device 10 according to the second embodiment. The liquid-crystal display device 10 according to the second embodiment differs from that according to the first embodiment in that the phase-difference compensation layer 510 formed in the liquid crystal panel 100 includes the C plate 511 and an O plate 512 and in that the phase-difference compensation member 520 disposed on the outside of the liquid crystal panel 100 includes one O plate 521.

Although the phase-difference compensation layer 510 is formed of a single C plate 511 in the first embodiment, the phase-difference compensation layer 510 may include the O plate 512 in addition to the C plate 511, as in the second embodiment. The phase-difference compensation layer 510 including the O plate 512 can compensate for a front-direction phase difference in addition to an oblique-direction phase difference. It is considered that the second embodiment achieves an even higher contrast, which is, for example, about twice the contrast achieved with the comparison example.

The O plate 512 is formed by, for example, obliquely depositing tantalum oxide or the like on the C plate 511. Either of the C plate 511 and the O plate 512 may be disposed closer to the liquid crystal layer 400, and the C plate 511 may be formed on the O plate 512 that is formed on the lens layer 320. Because the O plate 512 is provided in the liquid crystal panel 100 as a part of the phase-difference compensation layer 510, it does not require a separate light-transmissive base member, unlike the O plate 522, which is provided on the outside of the liquid crystal panel 100.

It is desirable that the O plate 521, serving as the phase-difference compensation member 520, be rotated about the substrate normal to be appropriately positioned so that the black level observed when no voltage is applied is minimum, that is, so that the highest contrast is achieved.

It is difficult to rotate the O plate 512, which is provided integrally with the liquid crystal panel 100 as a part of the phase-difference compensation layer 510, about the substrate normal to adjust the position thereof. Hence, it is preferable that at least one O plate 521 be provided in the phase-difference compensation member 520, which is disposed on the outside of the liquid crystal panel 100, so that it can be to be rotated about the substrate normal.

The invention may be further modified as follows. In the first embodiment, although it is preferable that the phase-difference compensation member 520 disposed on the outside of the liquid crystal panel 100 have the two O plates 521 and 522, the phase-difference compensation member 520 may have one O plate 521. The phase-difference compensation member 520 having at least one O plate 521 can compensate for a certain amount of front-direction phase difference.

Furthermore, in the first and second embodiments, it is possible to use an A plate instead of an O plate to compensate for a front-direction phase difference (in this configuration, in FIG. 1 or 4, for example, the phase-difference compensation plate 521 is an A plate). However, for higher compensation matching for the liquid crystal layer 400 in which the liquid crystal molecules are pretilted, the use of an O plate rather than an A plate is preferred.

As has been described above, in the liquid-crystal display device 10, it is preferable that, the phase-difference compensation layer 510 formed in the liquid crystal panel 100 include the C plate 511 and that the phase-difference compensation member 520 disposed on the outside of the liquid crystal panel 100 include the O plate 521 or the A plate 521.

The phase-difference compensation part 500, in which the C plate 511 and the O plate 521 or the A plate 521 are combined, can compensate for the phase difference of light caused by the liquid crystal layer 400 formed of the pretilted liquid crystal molecules 410 having a negative dielectric constant anisotropy. The phase-difference compensation part 500 in which the C plate 511 is provided in the phase-difference compensation layer 510 formed in the liquid crystal panel 100 achieves a higher contrast than a phase-difference compensation part 500 in which all the components are disposed on the outside of the liquid crystal panel 100.

It is preferable that the phase-difference compensation layer 510 be disposed between the lens layer 320 and the light-shielding members 241 in the thickness direction of the liquid crystal panel 100. In this configuration, the lens layer 320 and the light-shielding members 241 are not located between the phase-difference compensation layer 510 and the liquid crystal layer 400. The light propagation direction changes due to the refraction of light at the lens layer 320 and the diffraction of light at the opening region 103 defined by light-shielding members 241 as the light passes therethrough. Because the lens layer 320 and the light-shielding members 241 are not located between the phase-difference compensation layer 510 and the liquid crystal layer 400, it is possible to minimize the misalignment between the propagation direction of the light passing through the phase-difference compensation layer 510 and the propagation direction of the light passing through the liquid crystal layer 400.

The phase-difference compensation layer 510 may be formed either in the opposing substrate 300 or in the element substrate 200. However, when the phase-difference compensation layer 510 is formed in the opposing substrate 300, compared with a case where it is formed in the element substrate 200, it is easy to form the phase-difference compensation layer 510 in the liquid crystal panel 100, because, typically, in the typical liquid crystal panel 100, the opposing substrate 300 has a simpler structure than the element substrate 200, and thus, it is easy to find a space for the phase-difference compensation layer 510 in the opposing substrate 300.

When the phase-difference compensation layer 510 is formed in the opposing substrate 300, it is preferable that the phase-difference compensation layer 510 be disposed between the lens layer 320 and the common electrode 350. More specifically, it is preferable that the phase-difference compensation layer 510 be not located between the common electrode 350 and the liquid crystal layer 400 so that the effective voltage to be applied to the liquid crystal layer 400 does not decrease due to capacitor division caused by the phase-difference compensation layer 510.

Application Example

Figure 5:
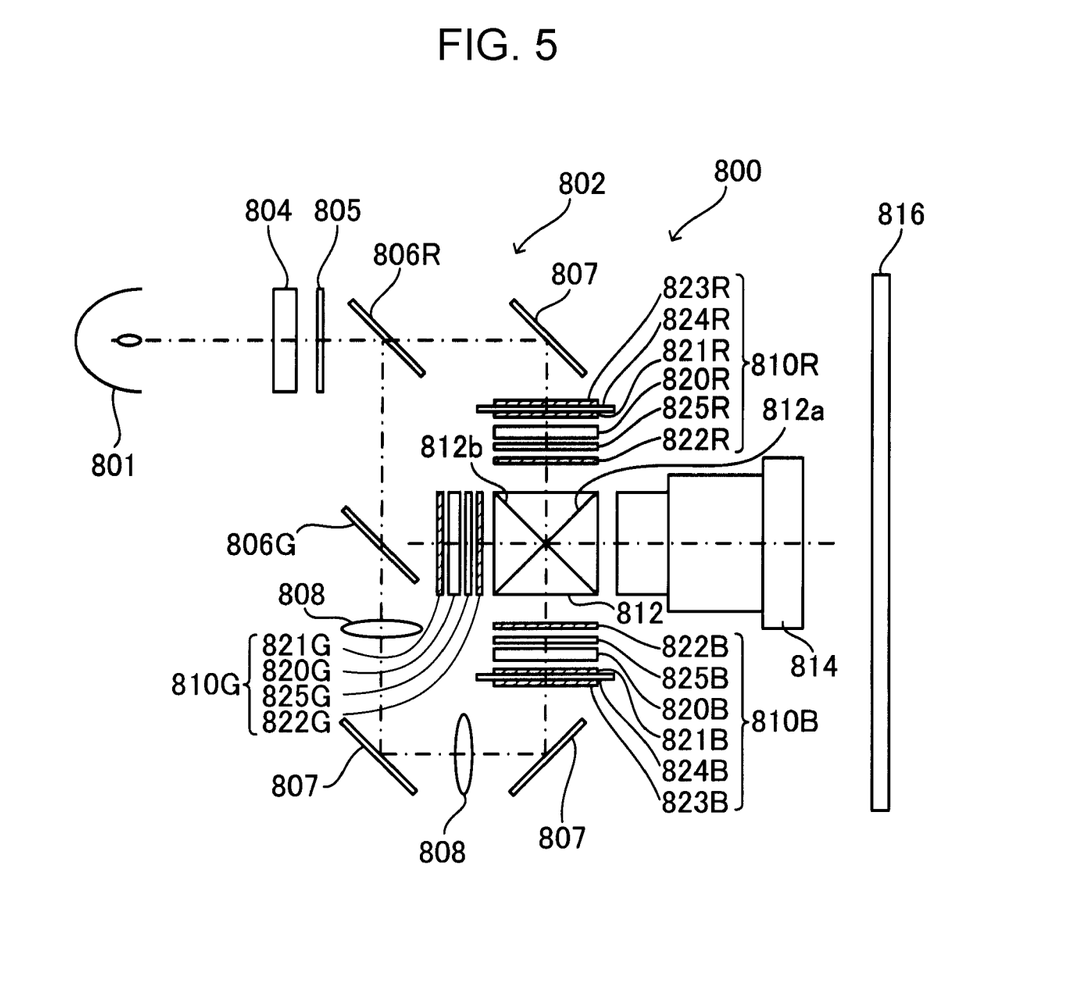
FIG. 5 schematically shows the optical system of a projector according to an application example.

Next, a projection display device (projector), serving as an application example of the above-described embodiments, will be described. FIG. 5 schematically shows an example optical system of a projector 800 according to the application example. The projector 800 includes: a light source device 801; an integrator 804; a polarization conversion element 805; a color-separation light-guide optical system 802; a liquid-crystal light-modulation device 810R, a liquid-crystal light-modulation device 810G, and a liquid-crystal light-modulation device 810B, serving as light modulation devices; a cross dichroic prism 812; and a projection optical system 814.

The liquid-crystal light-modulation devices 810R, 810G, and 810B have liquid crystal panels 820R, 820G, and 820B and phase-difference compensation members 825R, 825G, and 825B, respectively. The above-described liquid-crystal display device 10 may be used as the liquid-crystal light-modulation devices 810R, 810G, and 810B, the above-described liquid crystal panel 100 may be used as the liquid crystal panels 820R, 820G, and 820B, and the above-described phase-difference compensation member 520 may be used as the phase-difference compensation member 825R, 825G, 825B.

The light source device 801 supplies light containing: red light (hereinbelow, "R light"), which is the first color light; green light (hereinbelow, "G light"), which is the second color light; and blue light (hereinbelow, "B light"), which is the third color light. Examples of the light source device 801 include an extra-high-pressure mercury lamp.

The integrator 804 uniformizes the illumination distribution of the light emitted from the light source device 801. The light whose illumination distribution is uniformized is converted by the polarization conversion element 805 into polarized light having a specific vibration direction, such as s-polarized light, which is s-polarized with respect to the reflection surface of the color-separation light-guide optical system 802. The light converted into the s-polarized light is incident on an B-light-transmission dichroic mirror 806R, which constitutes the color-separation light-guide optical system 802.

The color-separation light-guide optical system 802 includes the R-light-transmission dichroic mirror 806R, a B-light-transmission dichroic mirror 806G, three reflective mirrors 807, and two relay lenses 808.

The R-light-transmission dichroic mirror 806R allows the R light to pass therethrough, while reflecting the G light and the B light. The R light passing through the R-light-transmission dichroic mirror 806R is incident on a reflective mirror 807.

The reflective mirror 807 bends the light path of the R light by 90 degrees. The R light, whose light path has been bent, is incident on the R-light liquid-crystal light-modulation device 810R. The R-light liquid-crystal light-modulation device 810R is a transmissive liquid-crystal device that modulates the R light according to an image signal.

The R-light liquid-crystal light-modulation device 810R includes a λ/2 retardation film 823R, a glass plate 824R, a first polarizing plate 821R, the liquid crystal panel 820R, the phase-difference compensation member 825R, and a second polarizing plate 822R. The λ/2 retardation film 823R and the first polarizing plate 821R are disposed so as to be in contact with the light-transmissive glass plate 824R, which does not change the polarizing direction. Although the second polarizing plate 822R is independent in FIG. 5, the second polarizing plate 822R may be in contact with the exit surface of the phase-difference compensation member 825R or the incident surface of the cross dichroic prism 812.

The R-light-transmission dichroic mirror 806R reflects the G light and the B light and bends their light paths by 90 degrees. The G light and the B light, whose light paths have been bent, are incident on the B-light-transmission dichroic mirror 806G. The B-light-transmission dichroic mirror 806G allows the B light to pass therethrough while reflecting the G light. The G light reflected by the B-light-transmission dichroic mirror 806G is incident on the G-light liquid-crystal light-modulation device 810G. The G-light liquid-crystal light-modulation device 810G is a transmissive liquid-crystal device that modulates the G light according to an image signal. The G-light liquid-crystal light-modulation device 810G includes a first polarizing plate 821G, the liquid crystal panel 820G, the phase-difference compensation member 825G, and a second polarizing plate 822G.

The G light to be incident on the G-light liquid-crystal light-modulation device 810G has been converted into s-polarized light. The s-polarized light incident on the G-light liquid-crystal light-modulation device 810G passes through the first polarizing plate 821G as it is and is incident on the liquid crystal panel 820G. The s-polarized light incident on the liquid crystal panel 820G is modulated according to an image signal, and thus, the G light is converted into p-polarized light. The G light, which has been modulated by the liquid crystal panel 820G and converted into p-polarized light, exits from the second polarizing plate 822G. The G light modulated by the G-light liquid-crystal light-modulation device 810G is incident on the cross dichroic prism 812.

The B light passing through the B-light-transmission dichroic mirror 806G is incident on the B-light liquid-crystal light-modulation device 810B via two relay lenses 808 and two reflective mirrors 807.

The B-light liquid-crystal light-modulation device 810B is a transmissive liquid-crystal device that modulates the B light according to an image signal. The B-light liquid-crystal light-modulation device 810B includes a λ/2 retardation film 823B, a glass plate 824B, a first polarizing plate 821B, the liquid crystal panel 820B, the phase-difference compensation member 825B, and a second polarizing plate 822B.

The B light to be incident on the B-light liquid-crystal light-modulation device 810B has been converted into s-polarized light. The s-polarized light incident on the B-light liquid-crystal light-modulation device 810B is converted into p-polarized light by the λ/2 retardation film 823B. The B light converted into p-polarized light passes through the glass plate 824B and the first polarizing plate 821B as it is and is incident on the liquid crystal panel 820B. The p-polarized light incident on the liquid crystal panel 820B is modulated according to an image signal, and the B light is converted into s-polarized light. The B light, which has been modulated by the liquid crystal panel 820B and converted into s-polarized light, exits from the second polarizing plate 822B. The B light modulated by the B-light liquid-crystal light-modulation device 810B is incident on the cross dichroic prism 812.

This way, the R-light-transmission dichroic mirror 806R and the B-light-transmission dichroic mirror 806G, which constitute the color-separation light-guide optical system 802, split the light supplied from the light source device 801 into the R light, which is the first color light, the G light, which is the second color light, and the B light, which is the third color light.

The cross dichroic prism 812, serving as a color-combining optical system, is formed of two dichroic films 812a and 812b that are arranged perpendicular to each other so as to form an X shape. The dichroic film 812a reflects the B light while allowing the G light to pass therethrough. The dichroic film 812b reflects the R light while allowing the G light to pass therethrough. This way, the cross dichroic prism 812 combines the R light, the G light, and the B light that have been modulated in the R-light liquid-crystal light-modulation device 810R, the G-light liquid-crystal light-modulation device 810G, and the B-light liquid-crystal light-modulation device 810B, respectively.

The projection optical system 814 projects the light combined in the cross dichroic prism 812 onto a screen 816. Thus, a full-color image is obtained on the screen 816. This way, the liquid-crystal display device 10 can be used in, for example, the projector 800.

The liquid-crystal display device 10 can be used in both front projectors in which projection images are projected from the side from which the images are viewed and rear projectors in which projection images are projected from the side opposite to the side from which the images are viewed.

Besides the projector 800, the liquid-crystal display device 10 is also applicable to, for example, displays of information terminals, such as: head-up displays (HUDs), which are projection devices; head mounted displays (HMDs), which are direct-view devices; electronic books; personal computers; digital still cameras; liquid crystal televisions; viewfinder or monitor-view type video recorders; car navigation systems; electronic notebooks; and point of sales (POS) systems.

The entire disclosure of Japanese Patent Application No. 2017-128124, filed Jun. 29, 2017 is expressly incorporated by reference herein.

What is claimed is:

1. A liquid-crystal display device comprising:
   a liquid crystal panel comprising:
      an element substrate;
      an opposing substrate;
      a liquid crystal layer interposed between the element substrate and the opposing substrate, the liquid crystal layer being formed of pretilted liquid crystal molecules having a negative dielectric constant anisotropy; and
      a phase-difference compensation layer interposed between the liquid crystal layer and the opposing substrate and including a C plate; and
   a phase-difference compensation member disposed externally to the liquid crystal panel and including an O plate or an A plate,
   wherein the phase-difference compensation member is disposed between the phase-difference compensation layer and a polarizing plate positioned at a light exit side of the liquid-crystal display device.

2. The liquid-crystal display device according to claim 1, wherein the phase-difference compensation member includes two O plates.

3. The liquid-crystal display device according to claim 1, wherein the phase-difference compensation layer includes the C plate and an O plate.

4. The liquid-crystal display device according to claim 1, wherein the phase-difference compensation layer is formed in the opposing substrate.

5. An electronic apparatus comprising:
the liquid-crystal display device according to claim 1.

6. An electronic apparatus comprising:
the liquid-crystal display device according to claim 2.

7. An electronic apparatus comprising:
the liquid-crystal display device according to claim 3.

8. An electronic apparatus comprising:
the liquid-crystal display device according to claim 4.

9. A liquid-crystal display device comprising:
a liquid crystal panel including:
a first substrate;
a liquid crystal layer having a negative dielectric constant anisotropy; and
a second substrate including a lens layer and a phase-difference compensation layer interposed between the liquid crystal layer and the lens layer, the phase-difference compensation layer including a negative C plate; and
a phase-difference compensation member disposed externally to the liquid crystal panel and including an O plate or an A plate,
wherein the phase-difference compensation member is disposed between the phase-difference compensation layer and a polarizing plate positioned at a light exit side of the liquid-crystal display device.

10. The liquid-crystal display device according to claim 9, wherein the first substrate includes a light-shielding member.

11. A liquid-crystal display device comprising:
a liquid crystal panel including:
a first substrate;
a liquid crystal layer having a negative dielectric constant anisotropy; and
a second substrate including a lens layer and a phase-difference compensation layer interposed between the liquid crystal layer and the lens layer and including no light-shielding member between the liquid crystal layer and the phase-difference compensation layer in a display region, the phase-difference compensation layer including a negative C plate; and
a phase-difference compensation member disposed externally to the liquid crystal panel and including an O plate or an A plate.

* * * * *